United States Patent [19]
Kolthammer et al.

[11] Patent Number: 5,869,575
[45] Date of Patent: Feb. 9, 1999

[54] ETHYLENE INTERPOLYMERIZATIONS

[75] Inventors: Brian W. S. Kolthammer; Robert S. Cardwell, both of Lake Jackson, Tex.

[73] Assignee: The Dow Chemical Company, Midland, Mich.

[21] Appl. No.: 980,695

[22] Filed: Nov. 24, 1997

Related U.S. Application Data

[63] Continuation of Ser. No. 510,527, Aug. 2, 1995, abandoned.

[51] Int. Cl.$^6$ .................................................. C08L 23/08
[52] U.S. Cl. ............................................... 525/240
[58] Field of Search ............................................. 525/240

[56] References Cited

U.S. PATENT DOCUMENTS

| | | |
|---|---|---|
| 3,014,702 | 12/1961 | Oldershaw et al. . |
| 3,239,197 | 3/1966 | Tollar . |
| 3,645,992 | 2/1972 | Elsten . |
| 3,914,342 | 10/1975 | Mitchell ................................. 525/240 |
| 4,205,021 | 5/1980 | Morita et al. . |
| 4,314,912 | 2/1982 | Lowery, Jr. et al. . |
| 4,320,088 | 3/1982 | Nicco . |
| 4,330,646 | 5/1982 | Sakurai et al. . |
| 4,405,774 | 9/1983 | Miwa et al. . |
| 4,421,162 | 12/1983 | Tollar . |
| 4,510,303 | 4/1985 | Oda et al. . |
| 4,530,914 | 7/1985 | Ewen et al. . |
| 4,544,762 | 10/1985 | Kaminsky et al. . |
| 4,547,475 | 10/1985 | Glass et al. . |
| 4,564,063 | 1/1986 | Tollar . |
| 4,612,300 | 9/1986 | Coleman, III . |
| 4,659,685 | 4/1987 | Coleman, III et al. . |
| 4,668,752 | 5/1987 | Tominari et al. . |
| 4,701,432 | 10/1987 | Welborn, Jr. ............................ 526/114 |
| 4,804,714 | 2/1989 | Olivo et al. ............................ 525/240 |
| 4,808,262 | 2/1989 | Aneja et al. . |
| 4,843,129 | 6/1989 | Spenadel et al. ....................... 525/240 |
| 4,935,474 | 6/1990 | Ewen et al. . |
| 4,937,299 | 6/1990 | Ewen et al. . |
| 4,960,878 | 10/1990 | Crapo et al. . |
| 4,981,760 | 1/1991 | Naito et al. ............................ 428/523 |
| 4,987,212 | 1/1991 | Morterol et al. . |
| 5,008,204 | 4/1991 | Stehling et al. ......................... 436/85 |
| 5,015,749 | 5/1991 | Schmidt et al. . |
| 5,026,798 | 6/1991 | Canich . |
| 5,041,583 | 8/1991 | Sangkoya . |
| 5,041,584 | 8/1991 | Crapo et al. . |
| 5,041,585 | 8/1991 | Deavenport et al. . |
| 5,055,438 | 10/1991 | Canich . |
| 5,057,475 | 10/1991 | Canich et al. . |
| 5,064,802 | 11/1991 | Steves et al. ........................... 526/134 |
| 5,066,738 | 11/1991 | Ewen . |
| 5,077,255 | 12/1991 | Welborn, Jr. . |
| 5,079,205 | 1/1992 | Canich . |
| 5,084,134 | 1/1992 | Mattiussi et al. . |
| 5,084,534 | 1/1992 | Welborn, Jr. et al. . |
| 5,084,540 | 1/1992 | Albizzati et al. . |
| 5,086,024 | 2/1992 | Crapo et al. . |
| 5,096,867 | 3/1992 | Canich . |
| 5,376,439 | 12/1994 | Hodgson et al. ....................... 428/220 |
| 5,395,810 | 3/1995 | Shamshoum et al. .................. 502/113 |
| 5,519,091 | 5/1996 | Tsutsui et al. .......................... 525/240 |
| 5,530,065 | 6/1996 | Farley et al. ........................... 525/240 |

FOREIGN PATENT DOCUMENTS

| | | | |
|---|---|---|---|
| 0374695 A2 | 12/1989 | European Pat. Off. | ...... C08F 210/06 |
| 0436328 A2 | 12/1990 | European Pat. Off. | ........ C08F 4/606 |
| 0447035 A2 | 2/1991 | European Pat. Off. | ...... C08F 297/08 |
| 0416815 | 3/1991 | European Pat. Off. . | |
| 0436399 | 7/1991 | European Pat. Off. . | |
| 0662989 B1 | 10/1993 | European Pat. Off. | ........ C08F 23/04 |
| 8703610 | 6/1987 | WIPO . | |
| 9003414 | 4/1990 | WIPO . | |
| 9104257 | 4/1991 | WIPO . | |
| 9109882 | 7/1991 | WIPO . | |
| 9200333 | 1/1992 | WIPO . | |
| 9308221 | 4/1993 | WIPO . | |

OTHER PUBLICATIONS

L. Wild, T. R. Ryle, D. C. Knobeloch, and I. R. Peat; "Determination of Branching Distributions in Polyethylene and Ethylene Copolymers"; *Journal of Polymer Science*; vol. 20, pp. 441–455 (1982).

K. K. Kohrer, L. G. Hazlitt and N. F. Whiteman; "Short Chain Branching Distribution of ULDPE"; *Journal of Plastic Film & Sheeting*; vol. 4, pp. 214–226 (1988).

SPO '92 "Future Trends in Polyolefins Technology" by Douglas M. Selman, pp. 11–16 (Sep. 23, 1992).

"Selected Applications For Constrained Geometry Catalyst Technology (CGCT) Polymers" by G. D. Schwank, presented and distributed at SPO '92 sponsered by Schotland Business Research, Inc., (Sep. 23, 1992).

SPO '92 Proceedings, "The Material Properties of Polymers Made From Constrained Geometry Catalysts" by Kurt W. Swogger, pp. 155–165 (1992).

"A New Family of Linear Ethylene Polymers Provides Enhanced Sealing Performance" by G.F. Van der Sanden and Richard W. Halle, (Feb./1992), *Tappi Journal*, pp. 99–103.

Society of Plastics Engineers Polyolefins VII International Conference Proceedings, "Structure Property Relationships in EXXPOL TM Polymers" by C.S. Speed, B. C. Trudell, A. K. Mehta and F. C. Stehling, pp. 45–66, (Feb. 24–27, 1991).

"The Marketing Challenge Created By Single Site Catalysts in Polyolefins" by Michael P. Jeffries, *1991 Speciality Polyolefins Conference (SPO '91)*, pp. 43–55 (Sep. 24, 1991).

*Primary Examiner*—Cecilia J. Tsang
*Assistant Examiner*—Patrick R. Delaney

[57] ABSTRACT

Processes for polymerizing ethylene/α-olefin interpolymer compositions are disclosed. The interpolymer compositions have a controlled composition and a controlled molecular weight distribution. The processes utilize a highly-efficient homogeneous catalyst composition in at least one reactor to produce a first interpolymer having a narrow composition distribution and a narrow molecular weight distribution, and a highly-efficient heterogeneous Ziegler catalyst in at least one other reactor. The reactors can be operated sequentially or separately, depending upon the desired product. The novel compositions have good optical properties (e.g., clarity and haze) and good physical properties (e.g., modulus, yield strength, toughness and tear). Useful products which can be formed from these compositions include film, molded articles and fiber.

27 Claims, No Drawings

ETHYLENE INTERPOLYMERIZATIONS

CROSS-REFERENCE TO RELATED APPLICATIONS

This is a continuation of application Ser. No. 08/510,527 filed Aug. 2, 1995 now abandoned.

FIELD OF THE INVENTION

This invention relates to ethylene interpolymers and interpolymerization processes. The processes utilize at least one homogeneous polymerization catalyst and at least one heterogeneous polymerization catalyst in separate reactors connected in series or in parallel. Interpolymers produced from such processes are thermoplastic and have surprisingly beneficial properties, including improved impact and tear properties, high modulus and higher crystallization temperatures, and are useful in making molded or shaped articles, film, and the like.

BACKGROUND OF THE INVENTION

There are known several polymerization processes for producing polyethylene and ethylene interpolymers, including suspension, gas-phase and solution processes. Of these, the solution process is of commercial significance due to the advantages described in U.S. Pat. No. 4,330,646 (Sakurai et al.), the disclosure of which is incorporated herein by reference. A most advantageous solution process would be found if the temperature of the polymerization solution could be increased and the properties of the polymers suitably controlled. U.S. Pat. No. 4,314,912 (Lowery et al.), the disclosure of which is incorporated herein by reference, describes a Ziegler-type catalyst suitable for use in high temperature solution polymerization processes. U.S. Pat. No. 4,612,300 (Coleman, III), the disclosure of which is incorporated herein by reference, and U.S. Pat. No. 4,330,646 describe a catalyst and solution polymerization process for producing polyethylenes having a narrow molecular weight distribution. U.S. Pat. No. 4,330,646 also describes a process for producing polyethylenes with a broader molecular weight distribution in a solution process. These processes are based on heterogeneous Ziegler type catalysts which produce interpolymers with broad composition distributions regardless of their molecular weight distribution. Such ethylene polymers have deficiencies in some properties, for instance, poor transparency and poor antiblocking properties.

Solution polymerization processes for producing ethylene interpolymers with narrow composition distributions are also known. U.S. Pat. No. 4,668,752 (Tominari et al.), the disclosure of which is incorporated herein by reference, describes the production of heterogeneous ethylene copolymers with characteristics which include a narrower composition distribution than conventional heterogeneous copolymers. The utility of such polymer compositions in improving mechanical, optical and other important properties of formed or molded objects is also described. The complex structures of the copolymers necessary to achieve such advantages are finely and difficultly controlled by nuances of catalyst composition and preparation; any drift in which would cause a significant loss in the desired properties. U.S. Pat. No. 3,645,992 (Elston), the disclosure of which is incorporated herein by reference, describes the preparation of homogeneous polymers and interpolymers of ethylene in a solution process operated at temperatures of less than 100° C. These polymers exhibit a "narrow composition distribution", a term defined by a comonomer distribution that within a given polymer molecule and between substantially all molecules of the copolymer is the same. The advantages of such copolymers in improving optical and mechanical properties of objects formed from them is described. These copolymers, however, have relatively low melting points and poor thermal resistance.

U.S. Pat. No. 4,701,432 (Welborn, Jr.), the disclosure of which is incorporated herein by reference, describes a catalyst composition for the production of ethylene polymers having a varied range of composition distributions and/or molecular weight distributions. Such compositions contain a metallocene and a non-metallocene transition metal compound supported catalyst and an aluminoxane. U.S. Pat. No. 4,659,685 (Coleman, III et al.), the disclosure of which is incorporated herein by reference, describes catalysts which are composed of two supported catalysts (one a metallocene complex supported catalyst and the second a non-metallocene transition metal compound supported catalyst) and an aluminoxane. The disadvantages of such catalysts in the commercial manufacture of ethylene polymers are primarily twofold. Although, the choice of the metallocene and a non-metallocene transition metal compounds and their ratio would lead to polymers of controlled molecular structure, the broad range of ethylene polymer structures required to meet all the commercial demands of this polymer family would require a plethora of catalyst compositions and formulations. In particular, the catalyst compositions containing aluminoxanes (which are generally required in high amounts with respect to the transition metal) are unsuitable for higher temperature solution processes as such amount of the aluminum compounds result in low catalyst efficiencies and yield ethylene polymers with low molecular weights and broad molecular weight distributions.

It would be desirable to provide an economical solution process which would provide ethylene interpolymers with controlled composition and molecular weight distributions. It would be additionally desirable to provide a process for preparing such interpolymers with reduced complexity and greater flexibility in producing a full range of interpolymer compositions in a controllable fashion. It would be particularly desirable to economically produce ethylene interpolymer compositions having improved impact and tear properties, improved optical properties, high modulus and higher thermal stabilities.

SUMMARY OF THE INVENTION

We have now discovered polymerization processes for preparing interpolymer compositions of controlled composition and molecular weight distributions. The processes utilize at least one homogeneous polymerization catalyst and at least one heterogeneous polymerization catalyst in separate reactors connected in series or in parallel.

The First Process comprises the steps of:

1. A process for preparing an ethylene/α-olefin interpolymer composition, comprising the steps of:
    (A) reacting by contacting ethylene and at least one other α-olefin under solution polymerization conditions in the presence of a homogeneous catalyst composition containing either no aluminum cocatalyst or only a small amount of aluminum cocatalyst in at least one reactor to produce a solution of a first interpolymer which has a narrow composition distribution and a narrow molecular weight distribution,
    B) reacting by contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer which has a broad composition distribution and a broad molecular weight distribution, and (C) combining the solution of the first interpolymer with the solution of the second interpolymer to form a high temperature polymer solution comprising the ethylene/α-olefin interpolymer composition, and (D) removing the solvent from the polymer solution of step (C) and recovering the ethylene/α-olefin interpolymer composition.

These polymerizations are generally carried out under solution conditions to facilitate the intimate mixing of the two polymer-containing streams. The homogeneous catalyst is chosen from those metallocene-type catalysts which are capable of producing ethylene/α-olefin interpolymers of sufficiently high molecular weight under solution process polymerization conditions (e.g., temperatures greater than or equal to about 100° C.). The heterogeneous catalyst is also chosen from those catalysts which are capable of efficiently producing the polymers under high temperature (e.g., temperatures greater than or equal to about 180° C.) solution process conditions.

In addition, there is provided a second process for preparing interpolymer compositions of controlled composition and controlled molecular weight distributions.

The Second Process comprises the steps of:

A process for preparing an ethylene/α-olefin interpolymer composition, comprising the steps of:

(A) polymerizing ethylene and at least one other α-olefin in a solution process under suitable solution polymerization temperatures and pressures in at least one reactor containing a homogeneous catalyst composition containing either no aluminum cocatalyst or only a small amount of aluminum cocatalyst to produce a first interpolymer solution comprising a first interpolymer having has a narrow composition distribution and a narrow molecular weight distribution, and (B) sequentially passing the interpolymer solution of (A) into at least one other reactor containing a heterogeneous Ziegler catalyst, ethylene and at least one other α-olefin under solution polymerization conditions and at a polymerization temperature higher than that used in (A), to form a high temperature polymer solution comprising the ethylene/α-olefin interpolymer composition, and (C) removing the solvent from the polymer solution of step (B) and recovering the ethylene/α-olefin interpolymer composition.

In either process, the homogeneous catalyst composition preferably exhibits a high reactivity ratio and very readily incorporates higher α-olefins.

The homogeneous catalysts employed in the production of the homogeneous ethylene interpolymer are desirably derived from monocyclopentadienyl complexes of the Group IV transition metals which contain a pendant bridging group attached to the cyclopentadienyl ring which acts as a bident ligand. Complex derivatives of titanium in the +3 or +4 oxidation state are preferred.

In another aspect of this invention, there are provided novel interpolymers of ethylene and at least one α-olefin, wherein the interpolymers have controlled composition and molecular weight distributions. The interpolymers have improved mechanical, thermal and optical properties and, surprisingly, the polymer compositions obtained by the processes described herein provide superior properties to materials obtained by merely blending the solid polymers obtained from process step (A) or (B) individually, in the First Process listed above.

The novel polymer compositions of the present invention can be ethylene homopolymers or, preferably, interpolymers of ethylene with at least one $C_3$–$C_{20}$ α-olefin and/or $C_4$–$C_{18}$ diolefins. Interpolymers of ethylene and 1-octene are especially preferred. The term "interpolymer" is used herein to indicate a copolymer, or a terpolymer, or the like. That is, at least one other comonomer is polymerized with ethylene to make the interpolymer.

DETAILED DESCRIPTION OF THE INVENTION

The homogeneous polymers and interpolymers of the present invention are herein defined as defined in U.S. Pat. No. 3,645,992 (Elston), the disclosure of which is incorporated herein by reference. Accordingly, homogeneous polymers and interpolymers are those in which the comonomer is randomly distributed within a given interpolymer molecule and wherein substantially all of the interpolymer molecules have the same ethylene/comonomer ratio within that interpolymer, whereas heterogeneous interpolymers are those in which the interpolymer molecules do not have the same ethylene/comonomer ratio.

The term "narrow composition distribution" used herein describes the comonomer distribution for homogeneous interpolymers and means that the homogeneous interpolymers have only a single melting peak and essentially lack a measurable "linear" polymer fraction. The narrow composition distribution homogeneous interpolymers can also be characterized by their SCBDI (Short Chain Branch Distribution Index) or CDBI (Composition Distribution Branch Index). The SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the narrow composition distribution homogeneous interpolymers and copolymers of the present invention is preferably greater than about 30 percent, especially greater than about 50 percent. The narrow composition distribution homogeneous interpolymers and copolymers used in this invention essentially lack a measurable "high density" (i.e., "linear" or homopolymer) fraction as measured by the TREF technique. The homogeneous interpolymers and polymers have a degree of branching less than or equal to 2 methyls/1000 carbons in about 15 percent (by weight) or less, preferably less than about 10 percent (by weight), and especially less than about 5 percent (by weight).

The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks). The heterogeneous interpolymers and polymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The homogeneous polymers and interpolymers used to make the novel polymer compositions of the present invention can be ethylene homopolymers or, preferably, interpolymers of ethylene with at least one $C_3$–$C_{20}$ α-olefin and/or $C_4$–$C_{18}$ diolefins. Homogeneous copolymers of ethylene and propylene, butene-1, hexene-1, 4-methyl-1-pentene and octene-1 are preferred and copolymers of ethylene and 1-octene are especially preferred.

Either, or both, of the homogeneous ethylene polymer and the heterogeneous ethylene polymer can be an ethylene homopolymer. Preferably, however, either the homogeneous ethylene polymer or the heterogeneous ethylene polymer is an ethylene/alpha-olefin interpolymer. Ethylene polymer compositions wherein both the homogeneous ethylene polymer and the heterogeneous ethylene polymer are ethylene/alpha-olefin interpolymers are especially preferred.

The homogeneous ethylene polymer and the heterogeneous ethylene polymer used in the compositions described herein can each be made separately in different reactors, and subsequently blended together to make the interpolymer compositions of the present invention. Preferably, though, the homogeneous ethylene polymer and the heterogeneous ethylene polymer used in the compositions described herein are made in a multiple reactor scheme, operated either in parallel or in series. In the multiple reactor scheme, at least one of the reactors makes the homogeneous ethylene polymer and at least one of the reactors makes the heterogeneous ethylene polymer. In a preferred mode of operation, the reactors are operated in a series configuration to make most advantage of the high polymerization temperatures allowed by the heterogeneous catalyst. When the reactors are connected in series, the polymerization reaction product from step (A) is fed directly (i.e., sequentially) into the reactor(s) for step (B) along with the ethylene/α-olefin reactants and heterogenous catalyst and solvent.

Other unsaturated monomers usefully polymerized according to the present invention include, for example, ethylenically unsaturated monomers, conjugated or nonconjugated dienes, polyenes, etc. Preferred monomers include the $C_2$–$C_{10}$ α-olefins especially ethylene, 1-propene, 1-butene, 1-hexene, 4-methyl-1-pentene, and 1-octene. Other preferred monomers include styrene, halo- or alkyl substituted styrenes; vinylbenzocyclobutane, 1,4-hexadiene, cyclopentene, cyclohexene and cyclooctene.

The density of the ethylene polymer compositions for use in the present invention is measured in accordance with ASTM D-792 and is generally from about 0.87 g/cm$^3$ to about 0.965 g/cm$^3$, preferably from about 0.88 g/cm$^3$ to about 0.95 g/cm$^3$, and especially from about 0.9 g/cm$^3$ to about 0.935 g/cm$^3$. The density of the homogeneous ethylene polymer used to make the ethylene polymer compositions is generally from about 0.865 g/cm$^3$ to about 0.92 g/cm$^3$, preferably from about 0.88 g/cm$^3$ to about 0.915 g/cm$^3$, and especially from about 0.89 g/cm$^3$ to about 0.91 g/cm$^3$. The density of the heterogeneous ethylene polymer used to make the ethylene polymer compositions is generally from about 0.9 g/cm$^3$ to about 0.965 g/cm$^3$, preferably from about 0.9 g/cm$^3$ to about 0.95 g/cm$^3$, and especially from about 0.915 g/cm$^3$ to about 0.935 g/cm$^3$.

Generally, the amount of the ethylene polymer produced using the homogeneous catalyst and incorporated into the ethylene polymer composition is from about 15 percent to about 85 percent, by weight of the composition, preferably about 25 percent to about 75 percent, by weight of the composition.

The molecular weight of the ethylene polymer compositions for use in the present invention is conveniently indicated using a melt index measurement according to ASTM D-1238, Condition 190 C/2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the ethylene polymer compositions used herein is generally from about 0.1 grams/10 minutes (g/10 min) to about 100 g/10 min, preferably from about 0.3 g/10 min to about 30 g/10 min, and especially from about 0.5 g/10 min to about 10 g/10 min.

Additives such as antioxidants (e.g., hindered phenolics (e.g., Irganox® 1010 made by Ciba Geigy Corp.), phosphites (e.g., Irgafos® 168 also made by Ciba Geigy Corp.)), cling additives (e.g., polyisobutylene (PIB)), antiblock additives, pigments, and the like can also be included in the polyethylene compositions, to the extent that they do not interfere with the enhanced composition properties discovered by Applicants.

The Homogeneous Catalysts

The homogeneous catalysts used in the invention are based on those monocyclopentadienyl transition metal complexes described in the art as constrained geometry metal complexes. These catalysts are highly efficient, meaning that they are efficient enough such that the catalyst residues left in the polymer do not influence the polymer quality. Typically, less than or equal to about 10 ppm of the metal atom (designated herein as "M") is detectable and, when using the appropriate cocatalyst (e.g., one of the aluminoxanes described herein) the detectable aluminum residue is less than or equal to about 250 ppm. Suitable constrained geometry catalysts for use herein preferably include constrained geometry catalysts as disclosed in U.S. application Ser. Nos.: 545,403, filed Jul. 3, 1990; 758,654, filed Sep. 12, 1991; 758,660, filed Sep. 12, 1991; 720,041, filed Jun. 24, 1991; and 817,202, filed Jan. 6, 1992, the teachings of all of which are incorporated herein by reference. The monocyclopentadienyl transition metal olefin polymerization catalysts taught in U.S. Pat. No. 5,026,798 (Canich), the teachings of which are incorporated herein by reference, are also suitable for use in preparing the polymers of the present invention.

The foregoing catalysts may be further described as comprising a metal coordination complex comprising a metal of group 4 of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety. The catalyst further comprises an activating cocatalyst.

Preferred catalyst complexes correspond to the formula:

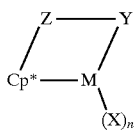

wherein:

M is a metal of group 4 of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group having up to 30 non-hydrogen atoms;

n is 1 or 2; and

Y is an anionic or nonanionic ligand group bonded to Z and M comprising nitrogen, phosphorus, oxygen or sulfur and having up to 20 non-hydrogen atoms, optionally Y and Z together form a fused ring system.

More preferably still, such complexes correspond to the formula:

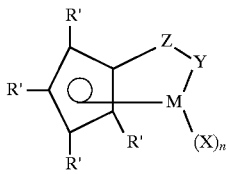

wherein:

R' each occurrence is independently selected from the group consisting of hydrogen, alkyl, aryl, and silyl, and combinations thereof having up to 20 non-hydrogen atoms;

X each occurrence independently is selected from the group consisting of hydride, halo, alkyl, aryl, silyl, aryloxy, alkoxy, amide, siloxy and combinations thereof having up to 20 non-hydrogen atoms;

Y is —O—, —S—, —NR*—, —PR*—, or a neutral two electron donor ligand selected from the group consisting of OR*, SR*, NR*$_2$ or PR*$_2$;

M is as previously defined; and

Z is SiR*$_2$, CR*$_2$, SiR*$_2$SiR*$_2$, CR*$_2$CR*$_2$, CR*=CR*, CR*$_2$SiR*$_2$, BR*; wherein R* each occurrence is independently selected from the group consisting of hydrogen, alkyl, aryl, silyl groups having up to 20 non-hydrogen atoms, and mixtures thereof, or two or more R* groups from Y, Z, or both Y and Z form a fused ring system; and n is 1 or 2.

Most highly preferred complex compounds are amidosilane- or amidoalkanediyl-compounds corresponding to the formula:

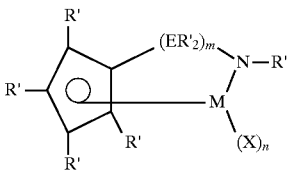

wherein:

M is titanium, zirconium or hafnium, bound in an $\eta^5$ bonding mode to the cyclopentadienyl group;

R' each occurrence is independently selected from the group consisting of hydrogen, alkyl and aryl and combinations thereof having up to 7 carbon atoms, or silyl;

E is silicon or carbon;

X independently each occurrence is hydride, halo, alkyl, aryl, aryloxy or alkoxy of up to 10 carbons, or silyl;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include: (tertbutylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)methylenetitanium dichloride, (tertbutylamido)dibenzyl(tetramethyl-$\eta^5$-cyclopentadienyl) silanezirconium dibenzyl, (benzylamido)dimethyl-(tetramethyl-$\eta^5$-cyclopentadienyl)silanetitanium dichloride, (phenylphosphido)dimethyl(tetramethyl-$\eta^5$-cyclopentadienyl)silanezirconium dibenzyl, (tertbutylamido)dimethyl(tetramethyl-$\eta^5$-cyclopentadienyl) silanetitanium dimethyl, and the like.

The catalyst compositions are derived from reacting the metal complex compounds with a suitable activating agent or cocatalyst or combination of cocatalysts. Suitable cocatalysts for use herein include polymeric or oligomeric aluminoxanes, especially aluminoxanes soluble in non-aromatic hydrocarbon solvent, as well as inert, compatible, noncoordinating, ion forming compounds; or combinations of polymeric/oligomeric aluminoxanes and inert, compatible, noncoordinating, ion forming compounds. Preferred cocatalysts contain inert, noncoordinating, boron compounds.

Ionic active catalyst species which can be used to polymerize the polymers described herein correspond to the formula:

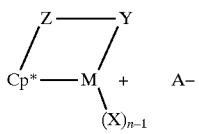

wherein:
- M is a metal of group 4 of the Periodic Table of the Elements;
- Cp* is a cyclopentadienyl or substituted cyclopentadienyl group bound in an $\eta^5$ bonding mode to M;
- Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
- X independently each occurrence is an anionic ligand group having up to 30 non-hydrogen atoms;
- n is 1 or 2; and
- A- is a noncoordinating, compatible anion.

One method of making the ionic catalyst species which can be utilized to make the polymers of the present invention involve combining:

a) at least one first component which is a mono (cyclopentadienyl) derivative of a metal of Group 4 of the Periodic Table of the Elements as described previously containing at least one substituent which will combine with the cation of a second component (described hereinafter) which first component is capable of forming a cation formally having a coordination number that is one less than its valence, and b) at least one second component which is a salt of a Bronsted acid and a noncoordinating, compatible anion.

Compounds useful as a second component in the preparation of the ionic catalysts useful in this invention can comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 4 cation) which is formed when the two components are combined and sufficiently labile to be displaced by olefinic, diolefinic and acetylenically unsaturated substrates or other neutral Lewis bases such as ethers, nitrites and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

(L-H)⁺ [A]⁻ 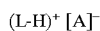

wherein:
- L is a neutral Lewis base;
- (L-H)⁺ is a Bronsted acid; and
- [A]⁻ is a compatible, noncoordinating anion.

More preferably [A]⁻ corresponds to the formula:

[BQq]⁻ 

wherein:
- B is boron in a valence state of 3; and
- Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide.

Illustrative, but not limiting, examples of boron compounds which may be used as a second component in the preparation of the improved catalysts of this invention are trialkyl-substituted ammonium salts such as triethylammonium tetraphenylborate, tripropylammonium tetraphenylborate, tris(n-butyl)ammonium tetraphenylborate, trimethylammonium tetrakis(p-tolyl)borate, tributylammonium tetrakis(pentafluorophenyl)borate, tripropylammonium tetrakis(2,4-dimethylphenyl)borate, tributylammonium tetrakis(3,5-dimethylphenyl)borate, triethylammonium tetrakis(3,5-di-trifluoromethylphenyl)borate and the like. Also suitable are N,N-dialkylanilinium salts such as N,N-dimethylanilinium tetraphenylborate, N,N-diethylanilinium tetraphenylborate, N,N,2,4,6-pentamethylanilinium tetraphenylborate and the like; dialkylammonium salts such as di(i-propyl)ammonium tetrakis(pentafluorophenyl)borate, dicyclohexylammonium tetraphenylborate and the like; and triarylphosphonium salts such as triphenylphosphonium tetraphenylborate, tris(methylphenyl)phosphonium tetrakis(pentafluorophenyl)borate, tris(dimethylphenyl)phosphonium tetraphenylborate and the like.

Preferred ionic catalysts are those having a limiting charge separated structure corresponding to the formula:

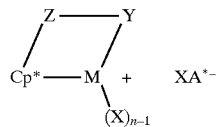

wherein:
- M is a metal of group 4 of the Periodic Table of the Elements;
- Cp* is a cyclopentadienyl or substituted cyclopentadienyl group bound in an $\eta^5$ bonding mode to M;
- Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
- X independently each occurrence is an anionic ligand group having up to 30 non-hydrogen atoms;
- n is 1 or 2; and
- $XA^{*31}$ is $^-X(B(C_6F_5)_3)$.

This class of cationic complexes can also be conveniently prepared by contacting a metal compound corresponding to the formula:

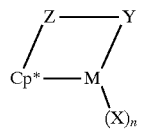

wherein:
- Cp*, M, and n are as previously defined, with tris(pentafluorophenyl)borane cocatalyst under conditions to cause abstraction of X and formation of the anion $-X(B(C_6F_5)_3)$.

Preferably X in the foregoing ionic catalyst is $C_1-C_{10}$ hydrocarbyl, most preferably methyl or benzyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

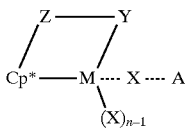

The catalysts are preferably prepared by contacting the derivative of a Group 4 metal with the tris (pentafluorophenyl)borane in an inert diluent such as an organic liquid. Tris(pentafluorphenyl)borane is a commonly available Lewis acid that may be readily prepared according to known techniques. The compound is disdosed in Marks, et al. *J. Am. Chem. Soc.* 1991, 113, 3623–3625 for use in alkyl abstraction of zirconocenes.

The homogeneous catalyst can contain either no aluminum cocatalyst or only a small amount (i.e., from about 3:1 Al:M ratio to about 100:1 Al:M ratio) of aluminum cocatalyst. For example, the cationic complexes used as homogeneous catalysts may be further activated by the use of an additional activator such as an alkylaluminoxane. Preferred co-activators include methylaluminoxane, propylaluminoxane, isobutylaluminoxane, combinations thereof and the like. So-called modified methylaluminoxane (MMAO) is also suitable for use as a cocatalyst. One technique for preparing such modified aluminoxane is disclosed in U.S. Pat. No. 4,960,878 (Crapo et al.), the disclosure of which is incorporated herein by reference. Aluminoxanes can also be made as disdosed in U.S. Pat. Nos. 4,544,762 (Kaminsky et al.); 5,015,749 (Schmidt et al.); 5,041,583 (Sangokoya); 5,041,584 (Crapo et al.); and 5,041,585 (Deavenport et al.), the disclosures of all of which are incorporated herein by reference.

The homogeneous catalysts useful for the production of the ethylene interpolymers of narrow composition and molecular weight distribution may also be supported on an inert support. Typically, the support can be any solid, particularly porous supports such as talc or inorganic oxides, or resinous support materials such as a polyolefin. Preferably, the support material is an inorganic oxide in finely divided form.

Suitable inorganic oxide materials which are desirably employed in accordance with this invention include Group IIA, IIIA, IVA, or IVB metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the homogeneous catalyst component added to the reaction slurry. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C. to about 800° C. Pressure considerations are not critical. The duration of the thermal treatment can be from about 1 to about 24 hours; however, shorter or longer times can be employed provided equilibrium is established with the surface hydroxyl groups.

The Heterogeneous Catalysts

The heterogeneous catalysts suitable for use in the invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,314,912 (Lowery, Jr. et al.), 4,547,475 (Glass et al.), and 4,612,300 (Coleman, III), the teachings of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-secbutylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein:

M is a metal of Groups IIB, IIIA or IVA of Mendeleev's Periodic Table of Elements, R is a monovalent organic radical, X is a halogen, Y has a value corresponding to the valence of M, and a has a value from 1 to y.

Preferred metallic halides are aluminum halides of the formula $AlR_{3-a}X_a$ wherein:

each R is independently hydrocarbyl as hereinbefore defined such as alkyl,

X is a halogen and a is a number from 1 to 3.

Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be preformed from the organomagnesium compound and the halide source or it can be formed in situ in which instance the catalyst is preferably prepared by mixing in a suitable solvent or reaction medium (1) the organomagnesium component and (2) the halide source, followed by the other catalyst components.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally, represented by the formulas: $TrX'_{4-q}(OR^1)_q$, $TrX'_{4-q}R^2_q$, $VOX'3$ and $VO(OR^1)_3$.

Tr is a Group IVB, VB, or VIB metal, preferably a Group IVB or VB metal, preferably titanium, vanadium or zirconium, q is 0 or a number equal to or less than 4, X' is a halogen, and $R^1$ is an alkyl group, aryl group or cycloalkyl group having from 1 to 20 carbon atoms, and $R^2$ is an alkyl group, aryl group, aralkyl group, substituted aralkyls, and the like. The aryl, aralkyls and substituted aralkys contain 1 to 20 carbon atoms, preferably 1 to 10 carbon atoms. When the transition metal compound contains a hydrocarbyl group, $R^2$, being an alkyl, cycloalkyl, aryl, or aralkyl group, the hydrocarbyl group will preferably not contain an H atom in the position beta to the metal carbon bond. Illustrative but non-limiting examples of aralkyl groups are methyl, neo-pentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O—i—C_3H_7)_4$, and $Ti(O-n-C_4H_9)_4$.

Illustrative examples of vanadium compounds include $VCl_4$, $VOCl_3$, $VO(OC_2H_5)_3$, and $VO(OC_4H_9)_3$.

Illustrative examples of zirconium compounds include $ZrCl4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

As indicated above, mixtures of the transition metal compounds may be usefully employed, no restriction being imposed on the number of transition metal compounds which may be contracted with the support. Any halogenide and alkoxide transition metal compound or mixtures thereof can be usefully employed. The previously named transition metal compounds are especially preferred with vanadium tetachloride, vanadium oxychloride, titanium tetraisopropoxide, titanium tetrabutoxide, and titanium tetrachloride being most preferred.

Suitable catalyst materials may also be derived from a inert oxide supports and transition metal compounds. Examples of such compositions suitable for use in the solution polymerization process are described in Copending application Ser. Nos. 07/644,053, filed Jan. 18, 1991 and 07/854,175, filed Mar. 20, 1992, the teachings of both of which are incorporated herein by reference.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. In general, optimum results are usually obtained by the use of inorganic oxides having an average particle size in the range of about 1 to 100 microns, preferably about 2 to 20 microns; a surface area of about 50 to 1,000 square meters per gram, preferably about 100 to 400 square meters per gram; and a pore volume of about 0.5 to 3.5 $cm^3$ per gram; preferably about 0.5 to 2 $cm^3$ per gram.

In order to further improve catalyst performance, surface modification of the support material may be desired. Surface modification is accomplished by specifically treating the support material such as silica, aluminia or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas and $R^1MgR^2$ and $R^1R^2AlR^3$ wherein each of $R^1$, $R^2$ and $R^3$ which may be the same or different are alkyl groups, aryl groups, cycloalkyl groups, aralkyl groups, alkoxide groups, alkadienyl groups or alkenyl groups. The hydrocarbon groups $R^1$, $R^2$ and $R^3$ can contain between 1 and 20 carbon atoms and preferably from 1 to about 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably form 60 to 90 minutes at a temperature in the range of 20° to 100° C. The diluent employed in slurrying the support can be any of the solvents employed in solubilizing the organometallic compound and is preferably the same.

In order to more readily produce interpolymer compositions of controlled composition and molecular weight distribution, the constrained-geometry component catalyst and the Ziegler-type transition metal catalyst component should have different reactivity ratios. The reactivity ratio of the homogeneous catalyst may be higher than the reactivity ratio of the heterogeneous catalyst. In such instances, the contribution of the narrow composition and molecular weight distribution polymer molecules, formed in the first reactor, to the whole interpolymer product would yield improvements in thermal resistance and crystallization behavior of the resin. Preferably, but not limiting, the reactivity ratio of the homogeneous catalyst introduced into the first reactor should be lower than the reactivity ratio of the heterogeneous catalyst in order to have the most benefit of a simplified process and to produce interpolymers of the most suitable compositions.

The reactivity ratios of the metallocenes and transition metal components in general are obtained by methods well known such as, for example, as described in "Linear Method for Determining Monomer Reactivity Ratios in Copolymerization", M. Fineman and S. D. Ross, *J. Polymer Science* 5, 259 (1950) or "Copolymerization", F. R. Mayo and C. Walling, *Chem. Rev.* 46, 191 (1950), the disclosures of both of which are incorporated herein in their entirety by reference.

For example, to determine reactivity ratios, the most widely used copolymerization model is based on the following equations:

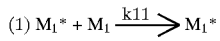

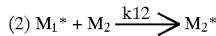

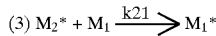

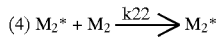

where $M_1$, $M_2$ refer to monomer molecules and $M_1^*$ or $M_2^*$ refer to a growing polymer chain to which monomer $M_1$ or $M_2$ has most recently attached. $M_1$ is typically ethylene; $M_2$ is typically an α-olefin comonomer.

The $k_{ij}$ values are the rate constants for the indicated reactions. In this case, $k_{11}$ represents the rate at which an ethylene unit inserts into a growing polymer chain in which the previously inserted monomer unit was also ethylene. The reactivity rates follows as: $r_1 = k_{11}/k_{12}$ and $r_2 = k_{22}/k_{21}$ wherein $k_{11}$, $k_{12}$, $k_{22}$, and $k_{21}$ are the rate constants for ethylene (1) or comonomer (2) addition to a catalyst site where the last polymerized monomer is ethylene ($k_{1X}$) or comonomer (2) ($k_{2X}$). A lower value of $r_1$ for a particular catalyst translates into the formation of an interpolymer of higher comonomer content produced in a fixed reaction environment. In a preferred embodiment of the invention, the reactivity ratio, $r_1$, of the homogeneous catalyst is less than half that of the heterogeneous catalyst.

Therefore, in the desirable practice of the invention, the homogeneous catalyst produces a polymer of higher comonomer content than that of the polymer produced by the heterogeneous in a reaction environment which is low in the concentration of the comonomer. As the contents of the first reactor enter a second reactor, the concentration of the comonomer in the second reactor is reduced. Hence, the reaction environment in which the heterogeneous catalyst forms polymer is such that a polymer containing a lower comonomer content is produced. Under such reaction conditions, the polymer so formed with have a well-defined and narrow composition distribution and narrow molecular weight distribution. The resulting whole interpolymer product can be readily controlled by choice of catalysts, comonomers, and reaction temperatures in an economical and reproducible fashion. In addition, simple changes in monomer concentrations and conversions in each reactor allows the manufacture of a broad range of interpolymer products.

The heterogeneous polymers and interpolymers used to make the novel polymer compositions of the present invention can be ethylene homopolymers or, preferably, interpolymers of ethylene with at least one $C_3$–$C_{20}$ α-olefin and/or $C_4$–$C_{18}$ diolefins. Heterogeneous copolymers of ethylene and 1-octene are especially preferred.

Polymerization

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes are particularly useful in the present invention, such as those disclosed in U.S. Pat. No. 3,914,342 (Mitchell), the disclosure of which is incorporated herein by reference. The multiple reactors can be operated in series or in parallel, with at least one constrained geometry catalyst employed in one of the reactors and at least one heterogeneous catalyst employed in at least one other reactor. Preferably, the polymerization temperature of the constrained geometry portion of the polymerization is lower than that of the heterogeneous polymerization portion of the reaction.

Separation of the interpolymer compositions from the high temperature polymer solution can be accomplished by use of devolatilizing apparatus known to those skilled in the art. Examples include U.S. Pat. No. 5,084,134 (Mattiussi et al.), U.S. Pat. No. 3,014,702 (Oldershaw et al.), U.S. Pat. No. 4,808,262 (Aneja et al.), U.S. Pat. No. 4,564,063 (Tollar), U.S. Pat. No. 4,421,162 (Tollar) or U.S. Pat. No. 3,239,197 (Tollar), the disclosures of which are incorporated herein in their entirety by reference.

Molecular Weight Distribution Determination

The interpolymer product samples analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = R \, w_i * M_i$, where $w_i$ and $M_i$ are the weight fraction and molecular weight, respectively, of the ith fraction eluting from the GPC column.

For the interpolymer fractions and whole interpolymers described herein, the term "narrow molecular weight distribution" means that the $M_w/M_n$ of the interpolymer (or fraction) is less than about 3, preferably from about 2 to about 3. The $M_w/M_n$ of the "narrow molecular weight distribution" interpolymer (or fraction) can also be described by the following equation: $(M_w/M_n) \leq (I_{10}/I_2) - 4.63$.

For the interpolymer fractions and whole interpolymers described herein, the term "broad molecular weight distribution" means that the $M_w/M_n$ of the interpolymer (or fraction) is greater than about 3, preferably from about 3 to about 5.

Crystallization Onset Temperature Measurement

The crystallization onset temperatures of the polyethylene compositions described herein are measured using differential scanning calorimetry (DSC). Each sample to be tested is made into a compression molded plaque according to ASTM D 1928. The plaques are then thinly sliced at room temperature using a Reichert Microtome or a razor blade to obtain samples having a thickness of about 15 micrometers. About 5 milligrams of each sample to be tested is placed in the DSC pan and heated to about 180° C., held at that temperature for 3 minutes to destroy prior heat history, cooled to −50° C. at a rate of 10° C./minute and held at that temperature for 2 minutes. The crystallization onset temperature and the peak temperature are recorded by the DSC as the temperature at which crystallization begins and the temperature at which the sample is as fully crystallized as possible, respectively, during the cooling period from 180° C. to −50° C.

Other useful physical property determinations made on the novel interpolymer compositions described herein include:

Melt flow ratio (MFR): measured by determining "$I_{10}$" (according to ASTM D-1238, Condition 190° C./10 kg (formerly known as "Condition (N)") and dividing the obtained $I_{10}$ by the $I_2$. The ratio of these two melt index terms is the melt flow ratio and is designated as $I_{10}/I_2$. For the homogeneous portion of the interpolymer composition, the $I_{10}/I_2$ ratio is generally greater than or equal to 5.63 and preferably from about 5.8 to about 8.5. For the heterogeneous portion of the interpolymer composition, the $I_{10}/I_2$ ratio is typically from about 6.8 to about 9.5. The $I_{10}/I_2$ ratio for the whole interpolymer compositions is typically from about 6.8 to about 10.5.

2% Secant Modulus: using a method similar to ASTM D 882, incorporated herein by reference, except that 4 specimens are used, a 4 inch gauge length is used and the conditioning period is 24 hours;

Clarity: measured by specular transmittance according to ASTM D 1746, except that the samples are conditioned for 24 hours;

Haze: measured according to ASTM D 1003, incorporated herein by reference;

Young's modulus, yield strength and elongation, break strength and elongation, and toughness: using a method similar to ASTM D 882, except that 4 specimens are used and are pulled at 20 inches per minute using a 2 inch gauge length;

Spencer Impact: using a method similar to ASTM D 3420, procedure "B", incorporated herein by reference, except that the maximum capacity is 1600 grams, the values are normalized for sample thickness and the conditioning period has been shortened from 40 hours to 24 hours; and Tensile Tear: using a method similar to ASTM D 1938, incorporated herein by reference, except that 4 specimens are used.

Useful articles which can be made from such interpolymer compositions include films (e.g., cast film, blown film or extrusion coated types of film), fibers (e.g., staple fibers, melt blown fibers or spunbonded fibers (using, e.g., systems as disclosed in U.S. Pat. No. 4,340,563, U.S. Pat. No. 4,663,220, U.S. Pat. No. 4,668,566, or U.S. Pat. No. 4,322,027, all of which are incorporated herein by reference), and gel spun fibers (e.g., the system disclosed in U.S. Pat. No. 4,413,110, incorporated herein by reference)), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)), and molded articles (e.g., blow molded articles, injection molded articles and rotomolded articles).

Films particularly benefit from such interpolymer compositions. Films and film structures having the novel properties described herein can be made using conventional hot blown film fabrication techniques or other biaxial orientation process such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416–417 and Vol. 18, pp. 191–192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference, can also be used to make novel film structures from the novel interpolymer compositions. Novel property combinations of such films include unexpectedly high machine and cross direction secant modulus, both first and second machine and cross direction yield, dart impact, cross direction tensile, clarity, 20° gloss, 45° gloss, low haze, low blocking force and low coefficient of friction (COF). In addition, these interpolymer compositions have better resistance to melt fracture (measured by determining onset of gross melt fracture and/or surface melt fracture, as described in U.S. Ser. No. 07/776,130 and in U.S. Ser. No. 07/939,281).

EXAMPLE 1

Homogeneous Catalyst Preparation

A known weight of the constrained-geometry organometallic complex [{(CH$_3$)$_4$C$_5$)}-(CH$_3$)$_2$Si-N-(t-C$_4$H$_9$)]Ti (CH$_3$)$_2$ was dissolved in Isopar E to give a clear solution with a concentration of Ti of 0.005M. A similar solution of the activator complex, tris(perfluoropheny)borane (0.010M) was also prepared. A catalyst composition of a few mL total volume was prepared by adding 2.0 mL of Isopar E solution of Ti reagent, 2.0 mL of the borane (for B:Ti=2:1) and 2 mL Isopar E to a 4 oz glass bottle. The solution was mixed for a few minutes and transferred by syringe to a catalyst injection cylinder on the polymerization reactor.

Heterogeneous Catalyst Preparation

A heterogeneous Ziegler-type catalyst was prepared substantially according to U.S. Pat. No. 4,612,300 (Ex. P.), by sequentially adding to a volume of isopar E, a slurry of anhydrous magnesium chloride in Isopar E, a solution of EtAlCl$_2$ in hexane, and a solution of Ti(O-iPr)$_4$ in Isopar E, to yield a composition containing a magnesium concentration of 0.17M and a ratio of Mg/Al/Ti of 40/12/3. An aliquot of this composition containing 0.064 mmol of Ti which was treated with a dilute solution of Et$_3$Al to give an active catalyst with a final Al/Ti ratio of 8/1. This slurry was then transferred to a syringe until if was required for injection into the polymerization reactor.

Polymerization

The polymerization described in this example demonstrates a process for the use of two catalysts, employed sequentially, in two polymerization reactors. A stirred, one-gallon (3.79 L) autoclave reactor is charged with 2.1 L of Isopar™ E (made by Exxon Chemical) and 388 mL of 1-octene comonomer and the contents are heated to 150° C. The reactor is next charged with ethylene sufficient to bring the total pressure to 450 psig. A solution containing 0.010 mmol of the active organometallic catalyst described in the catalyst preparation section is injected into the reactor using a high pressure nitrogen sweep. The reactor temperature and pressure are maintained constant at the desired final pressure and temperature by continually feeding ethylene during the polymerization run and cooling the reactor as necessary. After a 10 minute reaction time, the ethylene is shut off and the reactor is depressured to 100 psig. Hydrogen is admitted to the reactor and the contents heated. A slurry of the heterogeneous catalyst containing 0.0064 mmol Ti prepared as described in the catalyst preparation section is injected into the reactor using a high pressure nitrogen sweep. The reactor is then continually fed ethylene at 450 psig and the reaction temperature quickly rose to 185° C. where the polymerization is sustained for an additional 10 minutes. At this time the reactor is depressured and the hot polymer-containing solution transferred into a nitrogen-purged resin kettle containing 0.2 g Irganox 1010 antioxidant as a stabilizer. After removal of all the solvent in vacuo, the sample is then weighed (yield 270 g) to determine catalyst efficiencies (344300 g PE/g Ti).

EXAMPLES 2 and 3

Examples 2 and 3 are carried out as in Example 1 except using the catalyst amounts and reactor temperatures described in Table 1. The overall catalyst efficiencies are also shown in the Table.

The polymer products of Examples 1–3 are tested for various structural, physical and mechanical properties and the results are given in Tables 2, 2A and 2B. Comparative Example A is Attane® 4001 polyethylene and comparative example B is Attane® 4003. Both comparative examples are made by The Dow Chemical Company and are commercial ethylene-octene copolymers produced under solution process conditions using a typical commercial Ziegler-type catalyst. The data show the polymers of the invention have more narrow molecular weight distributions ($M_w/M_n$), higher melting points, better crystallization properties (i.e., higher crystallization onset temperatures) and, surprisingly, higher modulus than the commercial comparative examples A and B. The polymers of the invention surprisingly also show better optical properties (i.e., higher clarity and lower haze) than the comparative polymers, even though the polymers have about the same density. In addition, the polymers of the invention show better strength, toughness, tear and impact properties.

TABLE 1

Process Conditions for Reactor #1 for Examples 1–3

| Ex. | Monomer Volume (ml) | Reactor #1 Temp. (°C.) | $H_2$ (Reactor #1) (mmol) | Catalyst #1 (micromoles) |
|---|---|---|---|---|
| 1 | 300 | 154 | 0 | 10 |
| 2 | 300 | 141 | 0 | 5 |
| 3 | 300 | 134 | 0 | 4 |

TABLE 1A

Process Conditions for Reactor #2 for Examples 1–3

| Ex. | Monomer Volume (ml) | Reactor #2 Temp. (°C.) | $H_2$ (Reactor #2) (mmol) | Catalyst #2 (micromoles) | Overall Titanium Efficiency (g PE/g Ti) |
|---|---|---|---|---|---|
| 1 | 300 | 185 | 100 | 6.4 | 344300 |
| 2 | 300 | 191 | 100 | 9 | 410100 |
| 3 | 300 | 193 | 100 | 9 | 425600 |

TABLE 2

Examples 1–3 and Comparative Examples A and B

| Ex. | Density (g/cm³) | Melt Index ($I_2$) (g/10 min) | MFR ($I_{10}/I_2$) | $M_w$ | $M_n$ | MWD ($M_w/M_n$) |
|---|---|---|---|---|---|---|
| A | 0.9136 | 1.06 | 8.33 | 122500 | 32500 | 3.77 |
| B | 0.9067 | 0.79 | 8.81 | 135300 | 31900 | 4.25 |
| 1 | 0.9112 | 1.07 | 7.4 | 115400 | 40000 | 2.89 |
| 2 | 0.9071 | 1.23 | 7.32 | 117600 | 40300 | 2.92 |
| 3 | 0.9062 | 1.08 | 7.46 | 124500 | 40100 | 3.1 |

TABLE 2A

| Ex. | Melting Temp. (°C.) | Crysti. Onset Temp. (°C.) | 2% Secant Modulus | Young's Modulus (psi) | Clarity (specular trans.) | Haze (%) |
|---|---|---|---|---|---|---|
| A | 121 | 105 | 20389 | 20425 | 0.85 | 67 |
| B | 121 | 105 | 13535 | 13541 | 1.32 | 56 |
| 1 | 124 | 111 | 25634 | 25696 | 2.7 | 65 |
| 2 | 123 | 111 | 28144 | 28333 | 5.5 | 62 |
| 3 | 123 | 111 | 28650 | 28736 | 3.7 | 61 |

TABLE 2B

| Ex. | Yield Strength (psi) | Yield Elongation (%) | Break Strength (psi) | Break Elongation (%) | Toughness (ft.-lb.) | Spencer Impact (psi) | Tensile Strength (g/mil) |
|---|---|---|---|---|---|---|---|
| A | 1370 | 22 | 3133 | 693 | 1003 | 847 | 265 |
| B | 1108 | 24 | 2450 | 667 | 793 | 688 | 215 |
| 1 | 1541 | 16 | 4134 | 642 | 1155 | 897 | 311 |
| 2 | 1717 | 16 | 5070 | 658 | 1327 | 908 | 290 |
| 3 | 1756 | 15 | 4679 | 637 | 1234 | 903 | 311 |

EXAMPLE 4
Homogeneous Catalyst Preparation

A known weight of the constrained-geometry organometallic complex [{$(CH_3)_4C_5$}-$(CH_3)_2Si$—N-(t-$C_4H_9$)]Ti$(CH_3)_2$ is dissolved in Isopar E to give a clear solution with a concentration of Ti of 0.001M. A similar solution of the activator complex, tris(perfluoropheny)borane (0.002M) is also prepared. A catalyst composition of a few mL total volume is prepared by adding 1.5 mL of Isopar E solution of Ti reagent, 1.5 mL of the borane (for B:Ti=2:1) and 2 mL of a heptane solution of methylaluminoxane (obtained commercially from Texas Alkyls as MMAO Type 3A) containing 0.015 mmol Al to a 4 oz glass bottle. The solution is mixed for a few minutes and transferred by syringe to a catalyst injection cylinder on the polymerization reactor.
Heterogeneous Catalyst Preparation A heterogeneous Ziegler-type catalyst is prepared similarly to that in Ex. 1 to give an active catalyst containing 0.009 mmol Ti and a final Al/Ti ratio of 8/1. This slurry is then transferred to a syringe in preparation for addition to the catalyst injection cylinder on the polymerization reactor.

Polymerization

A stirred, one-gallon (3.79 L) autoclave reactor is charged with 2.1 L of Isopar™ E (made by Exxon Chemical) and 168 mL of 1-octene comonomer and the contents are heated to 120° C. The reactor is next charged with hydrogen and then with ethylene sufficient to bring the total pressure to 450 psig. A solution containing 0.0015 mmol of the active organometallic catalyst described in the catalyst preparation section is injected into the reactor using a high pressure nitrogen sweep. The reactor temperature and pressure are maintained at the initial run conditions. After a 10 minute reaction time, the ethylene is shut off and the reactor is depressured to 100 psig. At this time, an additional 168 mL of 1-octene is added to the reactor along with additional hydrogen and the contents heated. A slurry of the heterogeneous catalyst containing 0.009 mmol Ti prepared as described in the catalyst preparation section is injected into the reactor using a high pressure nitrogen sweep. The reactor is then continually fed ethylene at 450 psig and the reaction temperature quickly rises to 189° C. where the polymerization is sustained for an additional 10 minutes. At this time the reactor is depressured and the hot polymer-containing solution transferred into a nitrogen-purged resin kettle containing 0.2 g Irganox™ 1010 (a hindered phenolic antioxidant made by Ciba Geigy Corp.) as a stabilizer. After removal of all the solvent in vacuo, the sample is then weighed (yield 202 g) to determine catalyst efficiencies (401630 g PE/g Ti).

EXAMPLES 5–7

Examples 5–7 are carried out as in Example 4 except using the catalysts described in Example 1 and the catalyst amounts and reactor conditions described in Tables 3 and 3A. The overall catalyst efficiencies are also shown in Tables 3 and 3A.

These examples show that the reaction conditions can be readily controlled to vary the composition and molecular weight distribution of the polymer through a simple change in catalyst amounts and monomer concentrations. Table 4 shows that the interpolymers produced in these examples have a broader molecular weight distribution than those of the earlier examples demonstrating a unique feature of the process control. The physical and mechanical properties still show surprising enhancements over typical commercial copolymers of comparable molecular weight and composition, particularly in strength, impact and tear properties. Comparing examples 4 and 5 with comparative example A (as well as by comparing examples 6 and 7 with comparative example B) shows that the crystallization properties of the polymers of the invention are largely unaffected by broadening the $M_w/M_n$.

TABLE 3

Process Conditions for Reactor #1 for Examples 4–7

| Ex. | Monomer Volume (ml) | Reactor #1 Temp. (°C.) | Reactor #1 $H_2$ | Catalyst #1 (micromoles) | Overall Titanium Efficiency (g PE/g Ti) |
|---|---|---|---|---|---|
| 4 | 150 + 150 | 123 | 10 | 1.5 | 401630 |
| 5 | 150 + 150 | 139 | 50 | 5 | 422670 |

TABLE 3-continued

Process Conditions for Reactor #1 for Examples 4–7

| Ex. | Monomer Volume (ml) | Reactor #1 Temp. (°C.) | Reactor #1 $H_2$ | Catalyst #1 (micromoles) | Overall Titanium Efficiency (g PE/g Ti) |
|---|---|---|---|---|---|
| 6 | 300 + 150 | 122 | 0 | 4 | 337241 |
| 7 | 300 + 150 | 133 | 100 | 6 | 434933 |

TABLE 3A

Process Conditions for Reactor #2 for Examples 4–7

| Ex. | Monomer Volume (ml) | Reactor #2 Temp. (°C.) | Reactor #2 $H_2$ (mmol) | Catalyst #2 (micromoles) | Overall Titanium Efficiency (g PE/g Ti) |
|---|---|---|---|---|---|
| 4 | 150 + 150 | 189 | 300 | 9 | 401630 |
| 5 | 150 + 150 | 194 | 50 | 7.2 | 422670 |
| 6 | 300 + 150 | 189 | 400 | 9 | 337241 |
| 7 | 300 + 150 | 188 | 50 | 7.2 | 434933 |

TABLE 4

Interpolymer Properties

| Ex. | Density (g/cm³) | Melt Index ($I_2$) (g/10 min) | MFR ($I_{10}/I_2$) | $M_w$ | $M_n$ | MWD ($M_w/M_n$) |
|---|---|---|---|---|---|---|
| A | 0.9136 | 1.06 | 8.33 | 122500 | 32500 | 3.77 |
| 4 | 0.913 | 1.12 | 7.45 | 117900 | 29400 | 4.003 |
| 5 | 0.9136 | 1.17 | 8.07 | 135000 | 42100 | 3.209 |
| B | 0.9067 | 0.79 | 8.81 | 135300 | 31900 | 4.25 |
| 6 | 0.9108 | 3.3 | 7.4 | 89700 | 28700 | 3.122 |
| 7 | 0.9081 | 1.53 | 10.17 | 125700 | 31000 | 4.057 |

TABLE 4A

| Ex. | Melting peak (°C.) | Cryst. Onset Temp. (°C.) | Young's Modulus (psi) | 2% Secant Modulus | Clarity (specular trans.) | Haze (%) |
|---|---|---|---|---|---|---|
| A | 121 | 105 | 20425 | 20389 | 0.85 | 67 |
| 4 | 123 | 110 | 20333 | 20292 | 4.7 | 72 |
| 5 | 123 | 110 | 22648 | 22609 | 2.32 | 72 |
| B | 121 | 105 | 13541 | 13535 | 1.32 | 56 |
| 6 | 124 | 112 | 20100 | 20074 | 1.15 | 72 |
| 7 | 123 | 112 | 19836 | 19800 | 1.85 | 67 |

TABLE 4B

| Ex. | Yield strength (psi) | Yield elongation (%) | Break strength (psi) | Break elongation (%) | Toughness (ft-lbs) | Spencer Impact (psi) | Tensile Tear (g/mil) |
|---|---|---|---|---|---|---|---|
| A | 1370 | 22 | 3133 | 693 | 1003 | 847 | 265 |
| 4 | 1468 | 19 | 3412 | 671 | 1012 | 977 | 271 |
| 5 | 1659 | 16 | 3608 | 738 | 1224 | 994 | 313 |
| B | 1108 | 24 | 2450 | 667 | 793 | 688 | 215 |
| 6 | 1354 | 16 | 2737 | 670 | 885 | 1022 | 255 |
| 7 | 1326 | 21 | 2353 | 729 | 914 | 821 | 238 |

EXAMPLE 8

Homogeneous Catalyst Preparation

A known weight of the constrained-geometry organometallic complex [{(CH$_3$)$_4$C$_5$)}-(CH$_3$)$_2$Si—N-(t-C$_4$H$_9$)]Ti(CH$_3$)$_2$ is dissolved in Isopar E to give a clear solution with a concentration of Ti of 0.000M. A similar solution of the activator complex, tris(perfluoropheny)borane (0.002M) is also prepared. A catalyst composition of a few mL total volume is prepared by adding 1.5 mL of Isopar E solution of Ti reagent, 1.5 mL of the borane (for B:Ti=2:1) and 2 mL of a heptane solution of methylaluminoxane (obtained commercially from Texas Alkyls as MMAO) containing 0.015 mmol Al to a 4 oz glass bottle. The solution is mixed for a few minutes and transferred by syringe to a catalyst injection cylinder on the polymerization reactor.

Heterogeneous Catalyst Preparation

A heterogeneous Ziegler-type catalyst is prepared similarly to that in Ex. 1 to give an active catalyst containing 0.009 mmol Ti and a final Al/Ti ratio of 8/1. This slurry is then transferred to a syringe in preparation for addition to the catalyst injection cylinder on the polymerization reactor.

Polymerization

The polymerization described in this example demonstrates a process for the use of two catalysts, employed sequentially, in two polymerization reactors. A stirred, one-gallon (3.79 L) autoclave reactor is charged with 2.1 L of Isopar™ E (made by Exxon Chemical) and 168 mL of 1-octene comonomer and the contents are heated to 120° C. The reactor is next charged with hydrogen and then with ethylene sufficient to bring the total pressure to 450 psig. A solution containing 0.0015 mmol of the active organometallic catalyst described in the catalyst preparation section is injected into the reactor using a high pressure nitrogen sweep. The reactor temperature and pressure are maintained at the initial run conditions. After a 10 minute reaction time, the ethylene is shut off and the reactor is depressured to 100 psig. At this time, an additional 168 mL of 1-octene is added to the reactor along with additional hydrogen and the contents heated. A slurry of the heterogeneous catalyst containing 0.009 mmol Ti prepared as described in the catalyst preparation section is injected into the reactor using a high pressure nitrogen sweep. The reactor is then continually fed ethylene at 450 psig and the reaction temperature quickly rises to 189° C. where the polymerization is sustained for an additional 10 minutes. At this time the reactor is depressured and the hot polymer-containing solution transferred into a nitrogen-purged resin kettle containing 0.2 g Irganox™ 1010 (a hindered phenolic antioxidant made by Ciba Geigy Corp.) as a stabilizer. After removal of all the solvent in vacuo, the sample is then weighed (yield 202 g) to determine catalyst efficiencies (401630 g PE/g Ti).

EXAMPLES 9–14

Examples 9–14 are carried out as in Example 8 except using the catalysts described in Example 1 and the catalyst amounts and reactor conditions described in Tables 5 and 5A. The overall catalyst efficiencies are also shown in the Tables.

These examples show the ability to readily control the reaction conditions to vary the composition and molecular weight distribution of the polymer through a simple change in catalyst amounts and monomer concentrations. The polymers produced in these Examples show a broader molecular weight distribution than those of the earlier examples showing a unique feature of the process control. The physical and mechanical properties still show surprising enhancements over typical commercial copolymers of comparable molecular weight and composition, particularly in strength, impact and tear properties.

Comparative Example C is Dowlex® 2045, a commercial ethylene/1-octene copolymer made by The Dow Chemical Company. Comparative Example D is Dowlex® 2047, a commercial LLDPE ethylene/1-octene copolymer made by The Dow Chemical Company.

The data in Table 6 show that the molecular weight on ($M_w/M_n$) can surprisingly remain relatively low, demonstrating a unique feature of the process control of the invention.

TABLE 5

Process Conditions for Reactor #1 for Examples 8–14

| Ex. | Monomer Volume (ml) | Reactor #1 Temp (°C.) | Reactor #1 H$_2$ (mmol) | Catalyst #1 (micromoles) | Overall Titanium Efficiency (g PE/g Ti) |
|---|---|---|---|---|---|
| 8  | 155       | 158 | 25 | 12.5 | 286100 |
| 9  | 155       | 146 | 20 | 7.5  | 312400 |
| 10 | 155       | 156 | 0  | 7.5  | 326600 |
| 11 | 205       | 155 | 0  | 10   | 311900 |
| 12 | 230       | 149 | 0  | 7.5  | 312400 |
| 13 | 155       | 152 | 0  | 7.5  | 305300 |
| 14 | 150 + 150 | 145 | 0  | 7.5  | 298200 |

TABLE 5A

Process Conditions for Reactor #2 for Examples 8–14

| Ex. | Monomer Volume (ml) | Reactor #2 Temp (°C.) | Reactor #2 H$_2$ (mmol) | Catalyst #2 (micromoles) | Overall Titanium Efficiency (g PE/g Ti) |
|---|---|---|---|---|---|
| 8  | 155       | 190 | 150 | 7.2 | 286100 |
| 9  | 155       | 170 | 150 | 7.2 | 312400 |
| 10 | 155       | 188 | 200 | 7.2 | 326600 |
| 11 | 205       | 194 | 150 | 7.2 | 311900 |
| 12 | 230       | 194 | 150 | 7.2 | 312400 |
| 13 | 155       | 196 | 400 | 7.2 | 305300 |
| 14 | 150 + 150 | 195 | 150 | 7.2 | 298200 |

TABLE 6

| Ex. | Density (g/cm$^3$) | Melt Index (I$_2$) (g/10 min) | MFR (I$_{10}$/I$_2$) | $M_w$ | $M_n$ | MWD ($M_w/M_n$) |
|---|---|---|---|---|---|---|
| C  | 0.9202 | 1    | ND   | 110000 | 27300 | 4.03 |
| 8  | 0.9257 | 3.1  | 6.72 | 80400  | 32000 | 2.5  |
| 9  | 0.9225 | 1.43 | 6.89 | 99400  | 36800 | 2.7  |
| 10 | 0.9234 | 1.57 | 7.04 | 100400 | 35200 | 2.85 |
| D  | 0.9171 | 2.3  | ND   | 85500  | 22000 | 3.89 |
| 11 | 0.9158 | 1.39 | 7.15 | 100000 | 35100 | 2.85 |
| 12 | 0.916  | 0.91 | 7.16 | 113200 | 37700 | 3    |
| 13 | 0.915  | 0.84 | 7.94 | 106900 | 33300 | 3.21 |
| 14 | 0.9186 | 1.09 | 7.1  | 106200 | 36400 | 2.9  |

ND = Not Determined

TABLE 6A

| Ex. | Melt. Peak (°C.) | Crystal. Onset Temp. (°C.) | 2% Secant Modulus | Young's Modulus (psi) | Clarity (Specular Trans.) | Haze (%) |
|---|---|---|---|---|---|---|
| C | ND  | 107 | 29169 | 29253 | 3.55 | 55 |
| 8 | 123 | 111 | 48123 | 48209 | 0.15 | 75 |

TABLE 6A-continued

| Ex. | Melt. Peak (°C.) | Crystal. Onset Temp. (°C.) | 2% Secant Modulus | Young's Modulus (psi) | Clarity (Specular Trans.) | Haze (%) |
|---|---|---|---|---|---|---|
| 9 | 124 | 111 | 47815 | 47906 | 0.72 | 78 |
| 10 | 124 | 113 | 34077 | 34742 | 0.15 | 72 |
| D | ND | ND | 26094 | 26094 | 1.22 | 49 |
| 11 | 124 | 113 | 26245 | 26304 | 0.22 | 69 |
| 12 | 123 | 111 | 35492 | 35599 | 0.47 | 67 |
| 13 | 122 | 110 | 26466 | 26534 | 1.37 | 63 |
| 14 | 124 | 111 | 34989 | 35032 | 0.77 | 66 |

ND = Not Determined

TABLE 6B

| Ex. | Yield Strength (psi) | Yield elonga- tion (%) | Break strength (psi) | Break elonga- tion (%) | Tough- ness (ft-lb) | Spencer Impact (psi) | Tensile Tear (g/mil) |
|---|---|---|---|---|---|---|---|
| C | 1830 | 13 | 4395 | 689 | 1292 | 735 | 316 |
| 8 | 2628 | 12 | 3893 | 620 | 1335 | 992 | 450 |
| 9 | 2403 | 13 | 4375 | 613 | 1343 | 753 | 367 |
| 10 | 2240 | 13 | 3619 | 600 | 1179 | 1043 | 326 |
| D | 1600 | 15 | 4061 | 771 | 1351 | 716 | 285 |
| 11 | 1905 | 15 | 5079 | 700 | 1480 | 820 | 334 |
| 12 | 2043 | 15 | 5385 | 610 | 1404 | 976 | 336 |
| 13 | 1818 | 21 | 4504 | 612 | 1203 | 977 | 247 |
| 14 | 1933 | 16 | 4755 | 653 | 1332 | 741 | 283 |

In step (B) of the Second Process, the ethylene and α-olefin materials may be present as unreacted materials in the reaction product from step (A) or they can each be added to the polymerization reaction mixture in step (B) as needed to make the desired interpolymer. In addition, hydrogen or other telogen can be added to the polymerization mixture of step (B) to control molecular weight.

We claim:

1. A process for preparing an ethylene/α-olefin interpolymer composition, comprising the steps of:
   (A) reacting by contacting ethylene and at least one other α-olefin under solution polymerization conditions in the presence of an unsupported homogeneous mono-cyclopentadienyl transition metal catalyst composition in at least one reactor to produce a solution of a first interpolymer which has less than or equal to about 250 ppm of aluminum residue, a composition distribution breadth index (CDBI), defined as the weight percent of the polymer molecules having a comonomer content within 50 percent of the median total molar comonomer content of greater than about 50 percent, a degree of branching less than or equal to 2 methyls/1000 carbons in about 15 percent (by weight) or less of the first interpolymer, and a narrow molecular weight distribution,
   (B) reacting by contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer which has a degree of branching less than or equal to 2 methyls/1000 carbons in about 10 percent (by weight) or more, and a degree of branching equal to or greater than 25 methyls/1000 carbons in about 25 percent (by weight) or less of the second interpolymer, and a broad molecular weight distribution, wherein the Ziegler catalyst comprises (i) a solid support component derived from a magnesium halide or silica, and
(ii) a transition metal component represented by the formulas: $TrX'_{4-q}(OR^1)_q$, $TrX'_{4-q}R^2_q$, $VOX'3$ and $VO(OR^1)_3$, wherein:
   Tr is a Group IVB, VB, or VIB metal,
   q is 0 or a number equal to or less than 4,
   X' is a halogen, and
   $R^1$ is an alkyl group, aryl group or cycloalkyl group having from 1 to 20 carbon atoms, and
   $R^2$ is an alkyl group, aryl group, aralkyl group, or substituted aralkyl group, and
(C) combining the solution of the first interpolymer with the solution of the second interpolymer to form a high temperature polymer solution comprising the ethylene/α-olefin interpolymer composition, and
(D) removing the solvent from the polymer solution of step (C) and recovering the ethylene/α-olefin interpolymer composition.

2. The ethylene/α-olefin interpolymer composition produced by the process of claim 1.

3. The process of claim 1 wherein the α-olefinin in each of steps (A) and (B) is 1-octene.

4. The ethylene/1-octene interpolymer composition produced by the process of claim 3.

5. The process of claim 1 wherein the homogeneous catalyst composition comprises a metal coordination complex comprising a metal of group 4 of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constraininducing substituent, and provided further that for such complexes comprising more than one delocalized, substituted π-bonded moiety, only one thereof for each metal atom of the complex is a cyclic, delocalized, substituted π-bonded moiety.

6. The process of claim 5 wherein the homogeneous catalyst composition further comprises an activating cocatalyst.

7. The process of claim 5 wherein the metal coordination complex corresponds to the formula:

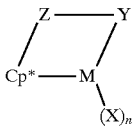

wherein:
M is a metal of group 4 of the Periodic Table of the Elements;
Cp* is a cyclopentadienyl or substituted cyclopentadienyl group bound in an $\eta^5$ bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group having up to 30 non-hydrogen atoms;
n is 1 or 2; and
Y is an anionic or nonanionic ligand group bonded to Z and M comprising nitrogen, phosphorus, oxygen or sulfur and having up to 20 non-hydrogen atoms, optionally Y and Z together form a fused ring system.

8. The process of claim 5 wherein the metal coordination complex corresponds to the formula:

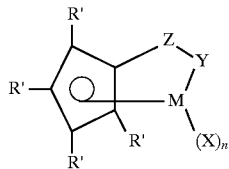

wherein:

R' each occurrence is independently selected from the group consisting of hydrogen, alkyl, aryl, and silyl, and combinations thereof having up to 20 non-hydrogen atoms;

X each occurrence independently is selected from the group consisting of hydride, halo, alkyl, aryl, silyl, aryloxy, alkoxy, amide, siloxy and combinations thereof having up to 20 non-hydrogen atoms;

Y is —O—, —S—, —NR*—, —PR*—, or a neutral two electron donor ligand selected from the group consisting of OR*, SR*, NR*$_2$ or PR*$_2$;

M is a metal of group 4 of the Periodic Table of the Elements; and

Z is SiR*$_2$, CR*$_2$, SiR*$_2$SiR*$_2$, CR*$_2$CR*$_2$, CR*=CR*, CR*$_2$SiR*$_2$, BR*; wherein R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system; and n is 1 or 2.

9. The process of claim 5 wherein the metal coordination complex is an amidosilane- or amidoalkanediyl-compound corresponding to the formula:

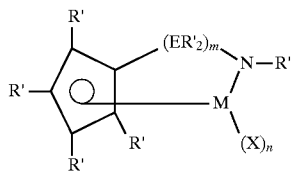

wherein:

M is titanium, zirconium or hafnium, bound in an $\eta^5$ bonding mode to the cydopentadienyl group;

R' each occurrence is independently selected from the group consisting of hydrogen, alkyl and aryl and combinations thereof having up to 7 carbon atoms, or silyl;

E is silicon or carbon;

X independently each occurrence is hydride, halo, alkyl, aryl, aryloxy or alkoxy of up to 10 carbons, or silyl;

m is 1 or 2; and n is 1 or 2.

10. The process of claim 5 wherein the metal coordination complex is an ionic catalyst having a limiting charge separated structure corresponding to the formula:

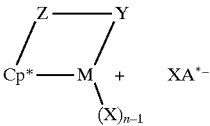

wherein:

M is a metal of group 4 of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group having up to 30 non-hydrogen atoms;

n is 1 or 2; and

XA*$^-$ is $^-$X(B(C$_6$F$_5$)$_3$).

11. The process of claim 1 wherein the homogeneous catalyst composition has a reactivity ratio less than half that of the heterogeneous catalyst.

12. A process for preparing an ethylene/α-olefin interpolymer composition, comprising the steps of:

(A) polymerizing ethylene and at least one other α-olefin in a solution process under suitable solution polymerization temperatures and pressures in at least one reactor containing an unsupported homogeneous monocyclopentadienyl transition metal catalyst composition to produce a first interpolymer solution comprising a first interpolymer having less than or equal to about 250 ppm of aluminum residue, a composition distribution breadth index (CDBI), defined as the weight percent of the polymer molecules having a comonomer content within 50 percent of the median total molar comonomer content of greater than about 50 percent, a degree of branching less than or equal to 2 methyls/1000 carbons in about 15 percent (by weight) or less of the first interpolymer, and a narrow molecular weight distribution, and (B) sequentially passing the interpolymer solution of (A) into at least one other reactor containing a heterogeneous Ziegler catalyst, ethylene and at least one other α-olefin under solution polymerization conditions and at a polymerization temperature higher than that used in (A), to form a high temperature polymer solution comprising the ethylene/α-olefin interpolymer composition, wherein the Ziegler catalyst comprises (i) a solid support component derived from a magnesium halide or silica, and (ii) a transition metal component represented by the formulas: TrX'$_{4-q}$(OR$^1$)$_q$, TrX'$_{4-q}$R$^2_q$, VOX'3 and VO (OR$^1$)$_3$, wherein:

Tr is a Group IVB, VB, or VIB metal, q is 0 or a number equal to or less than 4, X' is a halogen, and R$^1$ is an alkyl group, aryl group or cycloalkyl group having from 1 to 20 carbon atoms, and R$^2$ is an alkyl group, aryl group, aralkyl group, or substituted aralkyl group, and (C) removing the solvent from the polymer solution of step (B) and recovering the ethylene/α-olefin interpolymer composition.

13. The ethylene/α-olefin interpolymer composition produced by the process of claim 12.

14. The process of claim 12 wherein the α-olefin is 1-octene.

15. The ethylene/1-octene interpolymer composition produced by the process of claim 14.

16. The process of claim 12 wherein the homogeneous catalyst composition comprises a metal coordination complex comprising a metal of group 4 of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety.

17. The process of claim 12 wherein the homogeneous catalyst composition further comprises an activating cocatalyst.

18. The process of claim 16 wherein the metal coordination complex corresponds to the formula:

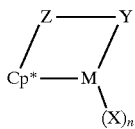

wherein:
M is a metal of group 4 of the Periodic Table of the Elements;
Cp* is a cyclopentadienyl or substituted cyclopentadienyl group bound in an $\eta^5$ bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group having up to 30 non-hydrogen atoms;
n is 1 or 2; and
Y is an anionic or nonanionic ligand group bonded to Z and M comprising nitrogen, phosphorus, oxygen or sulfur and having up to 20 non-hydrogen atoms, optionally Y and Z together form a fused ring system.

19. The process of claim 16 wherein the metal coordination complex corresponds to the formula:

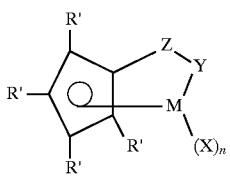

wherein:
R' each occurrence is independently selected from the group consisting of hydrogen, alkyl, aryl, and silyl, and combinations thereof having up to 20 non-hydrogen atoms;
X each occurrence independently is selected from the group consisting of hydride, halo, alkyl, aryl, silyl, aryloxy, alkoxy, amide, siloxy and combinations thereof having up to 20 non-hydrogen atoms;
Y is —O—, —S—, —NR*—, —PR*—, or a neutral two electron donor ligand selected from the group consisting of OR*, SR*, NR*$_2$ or PR*$_2$;
M is a metal of group 4 of the Periodic Table of the Elements; and
Z is SiR*$_2$, CR*$_2$, SiR*$_2$SiR*$_2$, CR*$_2$CR*$_2$, CR*=CR*, CR*$_2$SiR*$_2$, BR*; wherein
R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system; and n is 1 or 2.

20. The process of claim 16 wherein the metal coordination complex is an amidosilane- or amidoalkanediyl-compound corresponding to the formula:

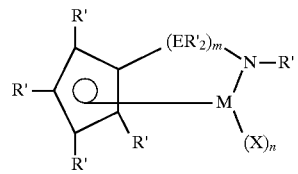

wherein:
M is titanium, zirconium or hafnium, bound in an $\eta^5$ bonding mode to the cyclopentadienyl group;
R' each occurrence is independently selected from the group consisting of hydrogen, alkyl and aryl and combinations thereof having up to 7 carbon atoms, or silyl;
E is silicon or carbon;
X independently each occurrence is hydride, halo, alkyl, aryl, aryloxy or alkoxy of up to 10 carbons, or silyl;
m is 1 or 2; and
n is 1 or 2.

21. The process of claim 16 wherein the metal coordination complex is an ionic catalyst having a limiting charge separated structure corresponding to the formula:

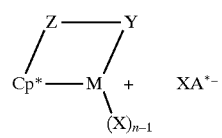

wherein:
M is a metal of group 4 of the Periodic Table of the Elements;
Cp* is a cyclopentadienyl or substituted cyclopentadienyl group bound in an $\eta^5$ bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group having up to 30 non-hydrogen atoms;
n is 1 or 2; and
XA*$^-$ is $^-$X(B(C$_6$F$_5$)$_3$).

22. The process of claim 12 wherein the homogeneous catalyst composition has a reactivity ratio less than half that of the heterogeneous catalyst.

23. The process of claims 1 or 12 wherein the first interpolymer has long chain branching.

24. The process of claims 1 or 12 wherein the first interpolymer has from about 0.01 to about 3 long chain branches per 1000 carbons.

25. The process of claims 1 or 12 wherein the first interpolymer has a molecular weight distribution, $M_w/M_n$, of less than about 3.5, and an $I_{10}/I_2$ ratio and molecular weight distribution, $M_w/M_n$, corresponding to the relationship: $M_w/M_n \leq I_{10}/I_2 - 4.63$.

26. The process of claims 1 or 12 wherein the first interpolymer has a critical shear stress at onset of gross melt fracture of greater than about $4 \times 10^6$ dyne/cm$^2$.

27. The process of claims 1 or 12 wherein the first interpolymer has a critical shear rate at onset of surface melt fracture at least fifty percent greater than the critical shear rate at onset of surface melt fracture of a linear polymer having about the same $M_w/M_n$ and $I_2$.

* * * * *

UNITED STATES PATENT AND TRADEMARK OFFICE
CERTIFICATE OF CORRECTION

PATENT NO.   : 5,869,575                                             Page 1 of 1
DATED        : February 9, 1999
INVENTOR(S)  : Brian W.S. Kolthammer and Robert S. Cardwell It is certified that error appears in the above-identified patent and that said Letters Patent is hereby corrected as shown below:

<u>Title page,</u>
Item [63], the Related U.S. Application Data, should read -- Continuation of Ser. No. 510,527, Aug. 2, 1995, abandoned; which is a continuation of Ser. No. 10,958, Jan. 29, 1993, abandoned. --

This certificate supersedes Certificate of Correction issued July 9, 2002.

Signed and Sealed this

Tenth Day of December, 2002

JAMES E. ROGAN
*Director of the United States Patent and Trademark Office*